United States Patent [19]

Robin et al.

[11] 4,028,416

[45] June 7, 1977

[54] HINDERED PHENOL AMINES

[75] Inventors: Michael Robin, Colonia, N.J.;
Sheldon R. Schulte, Columbus, Ohio

[73] Assignee: Ashland Oil, Inc., Ashland, Ky.

[22] Filed: Feb. 14, 1972

[21] Appl. No.: 226,236

[52] U.S. Cl. .................. 260/570.5 P; 260/45.9 R;
260/570.9; 260/803; 260/809; 252/403

[51] Int. Cl.² ........................................ C07C 87/28

[58] Field of Search ................. 260/570.9, 570.5 P

[56] References Cited

UNITED STATES PATENTS

| | | | |
|---|---|---|---|
| 2,353,192 | 7/1944 | Sargent et al. | 260/570.5 UX |
| 3,098,841 | 7/1963 | Morris et al. | 260/570.5 X |
| 3,214,376 | 10/1965 | Morway | 260/570.5 UX |
| 3,429,812 | 2/1969 | Kievlevich et al. | 260/570.5 X |
| 3,472,773 | 10/1969 | Holst et al. | 260/570.5 X |

*Primary Examiner*—Robert V. Hines

[57] ABSTRACT

A class of compounds are disclosed of the formula:

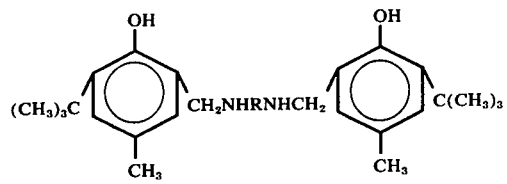

wherein R represents an alkylene or alkylidene radical having from 2 to 10 carbon atoms, which compounds are effective inhibitors for oxidation prone hydrocarbon materials in general and represent singularly effective stabilizers for rubber, both natural and synthetic, as well as certain plastic compositions containing a rubbery phase. An improved process for preparing the aforesaid compounds and certain homologs thereof likewise representing useful oxidation inhibitors is additionally disclosed.

2 Claims, No Drawings

HINDERED PHENOL AMINES

BACKGROUND OF THE INVENTION

This invention relates to bis(2-hydroxyalkylbenzyl)-diaminoalkanes and to a method for the preparation thereof.

DESCRIPTION OF THE PRIOR ART

It has heretofore been proposed to react an alkyl phenol with formaldehyde and an alkylene diamine in accordance with the Mannich reaction to provide condensates whose calcium salts are taught as being useful as oxidation and corrosion inhibitors for the lubricating oils commonly used in the internal combustion type engine. Particularly exemplary of this prior art are U.S. Pat Nos. 3,472,773 and 3,539,633.

While the manner of carrying out the process exemplified in this prior art leads to the formation of condensation products purportedly suitable for the indicated uses, it is, on the other hand, incapable of providing a substantially pure form of the bis(hydroxydialkylbenzyl)diaminoalkanes useful for the purposes contemplated herein.

SUMMARY OF THE INVENTION

In accordance with this invention, it has been found that a class of novel compounds corresponding to the structural formula:

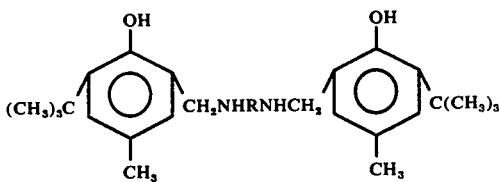

wherein R represents a $C_2$-$C_{10}$ alkylene or alkylidene radical, are singularly effective stabilizers for a variety of oxidation prone hydrocarbon materials, particularly representative of which are natural and synthetic rubber, the various high molecular weight polyolefins and the resin modified synthetic rubber compositions, commonly referred to as ABS Resins.

In another aspect of the present invention, an improved process is provided for the preparation of the above-defined compounds and certain homologous variants thereof. The process of this invention broadly comprises first reacting the appropriately substituted phenol with an applicable alkylene or alkylidene diamine followed by condensing this initial reaction mixture with formaldehyde, all in general accordance with the Mannich condensation procedure. However, the manner contemplated for effecting the overall reaction as aforesaid, details of which are set forth hereinbelow, constitutes the gist of this aspect of the instant invention.

DESCRIPTION OF THE PREFERRED EMBODIMENTS

As indicated hereinabove, the dialkyl phenol from whence the novel compounds of this invention are derived is 2-t-butyl-p-cresol. However, in the implementation of our novel process to obtain suitable oxidation inhibitors a variety of other 2,4-dialkyl substituted phenols can be utilized. These include those dialkyl phenols substituted in the number 2 position with a $C_1$-$C_{12}$ alkyl group and in number 4 position with an alkyl group containing not in excess of four carbon atoms. With respect to the number 2 substituent, the preferred groups are those containing at least one tertiary carbon atom so that bulkiness is desirably provided in this hindering position. Processes for deriving the foregoing dialkyl substituted phenols are well known in the art; such basically involving the controlled alkylation of phenol, conventionally using a terminal olefin or an alkyl chloride as the alkylating agent in the presence of a Friedel-Crafts alkylation catalyst.

The starting alkylene or alkylidene diamines useful in the practice of both aspects of this invention are commercially available and comprise those primary diamines in which the terminal amino groups are connected with the $C_2$-$C_{10}$ alkylene or alkylidene radical. The alkylene diamines are preferred primarily from the standpoint of ready availability.

A critical feature of the improved process set forth herein resides in the use of an alcoholic solvent for carrying out the Mannich condensation. Suitable alcohols in this context broadly include the $C_1$-$C_8$ alkanols. An especially preferred alkanol is isopropanol because its boiling point characteristics permit the carrying out of the condensation reaction under reflux conditions at about the optimum reaction temperature. A suitable amount of the alkanol on an avoirdupois basis corresponds to about the amount of the phenol employed in the reaction system. The concentration of reactants in the selected alkanol, however, can be varied appreciably.

In carrying out the initial step of the Mannich reaction, the selected phenol, preferably in molten form, is added to a reactor charged with the alkanol solvent. Thereupon, a 0.5 molar amount of the diamine based on the charged phenol is slowly added to the reaction mixture while maintaining the temperature between 0° and 50° C. The preferred temperature range for effecting this initial portion of the reaction is between about 20° and 30° C. The reaction occurring in this step is exothermic and it may be necessary to apply cooling in order to maintain the temperature at or below the maximum limit specified. Whether or not applied cooling is called for is primarily governed by the temperature observed in carrying out the reaction and/or the rate of addition of the diamine.

Following the addition of the diamine, an equal molar amount of formaldehyde based on the phenol charged initially is then added slowly. It is likewise important to maintain the reaction temperature below about 50° C. during the addition of the formaldehyde. A suitable temperature for this step also ranges from 0°–50° C., and likewise is preferably between about 20°–30° C. This phase of the reaction is also exothermic and applied cooling may be called for, depending upon the rate of addition of the formaldehyde and/or the reaction temperature sought to be maintained.

After the addition of the formaldehyde in the manner set forth, the reaction mixture is held at the indicated temperature until it is noted that the exotherm has substantially subsided. In observing the preferred temperature for this phase of the reaction, it has been found to be a good operating practice to hold the reaction mixture at such temperature for about 30 minutes before heating to the elevated temperature called for in order to effect the completion of the condensation. The applicable temperature range for carrying out the latter is between about 70° and 100° C. A more preferred temperature range is from about 80°–90° C. Where the preferred alkanol, vis., isopropanol, is used, this step of the reaction is preferably carried out at the reflux temperature thereof.

The length of time for holding at the aforesaid elevated temperature depends upon the yield of the product sought. The holding time required to obtain at least a 50% yield of product is about 4 hours. Heating for a time of about 8 hours will result in maximum yields, usually in the order of about 80%. Following the completion of the reaction, the reaction mixture is cooled so as to complete precipitation of the product and the usual workup procedures for recovering a crystalline chemical species is applicable.

For the purpose of illustrating the best mode contemplated for carrying out the present invention the following working examples are set forth. As indicated, these examples are given primarily by way of illustration and accordingly, any enumeration of detail contained therein is not to be construed as a limitation on the invention except to the extent such is expressed in the appended claims. All parts are parts by weight unless otherwise indicated.

EXAMPLE I

This example illustrates preparation of N,N′di-(3-t-butyl-2-hydroxy-5-methylphenyl)methyl-diamino ethane.

Into a suitable glass-lined reaction vessel equipped with an agitator, thermometer, reflux condenser and cooling means were charged 100 parts of 99% isopropanol. With agitation, 123 parts (0.75 mole) of molten 2-t-butyl-4-methylphenol were next added to the reaction vessel. The solution of phenol was cooled to 25° C. whereupon 22.5 parts (0.375 mole) of 99% ethylene diamine were slowly added over a period of 30 minutes. The temperature of the reaction mixture during the addition of the diamine was maintained at 25° ± 5° C. Upon completion of the addition of the diamine, 22.5 parts of 50% aqueous formaldehyde (0.75 mole) were added while maintaining the temperature at 25° ± 5° C. The addition of the formaldehyde was accomplished in 30 minutes. Following the addition of the formaldehyde, the reaction mixture was held for 30 minutes with agitation at 25° C. Thereupon, the reaction mixture was heated to reflux (85° C.) and maintained thereat for eight hours. The reaction mixture was then cooled to about 50° C. and a solid product was separated therefrom by filtration. The mother liquor was then cooled to about 25° C. to obtain an additional yield of solid product. The product cake was washed with isopropanol followed by water until the washed liquor exhibited an essentially neutral pH of 6.5–7.5. The product was then dried. Approximately 90 parts of a white crystalline material melting at 146°–150° C. was obtained. Calculated percent nitrogen for $C_{26}H_{40}N_2O_2$ was 6.79. Percent nitrogen found: 6.70.

EXAMPLE II

N-N′di-(3,5-di-tert-butyl-2-hydroxyphenyl)methyl-diamino ethane was prepared in the reaction vessel described in Example I employing the identical processing procedure observed therein. In this example, 130 ml of 99% isopropanol was used as the solvent. The charge of 2,4-di-tert-butylphenol was 206 grams. The amounts of ethylene and 50% aqueous formaldehyde utilized in the reaction were 30 and 60 grams, respectively.

Employing the recovery and purification procedure described in Example I, 200 grams of crystalline product melting at 158°–161° C. was obtained. Elemental and IR analysis data confirmed the ascribed structure.

EXAMPLE III

The product of Example I was admixed with polyethylene of 0.96 density and 300,000 molecular weight in a steel container and the resultant mixture extruded twice at 300° F. The concentration of the diamino ethane was adjusted to 0.1% by weight of the polymer by the addition of polyethylene thereto and the mixture again extruded twice at 300° F. The extruded composition was then pressed into 6–6.5 mil film at 310° F. and 1280 p.s.i. on a 10 inch hydraulic ram press.

A blank test strip containing no additive and a test strip containing 0.1% of 2,2′-methylene bis(6-t-butyl-4-methylphenol) were prepared in a manner identically as described above. The indicated test films were subjected to exposure at 125° ± 1° C. in a forced draft oven and absorbance in the carbonyl region of the IR spectrum (5.8 microns) was noted periodically during the exposure testing. When the absorbance reaches 94%, the sample is regarded to be "oxidized". The time of exposure to reach this point for the various test examples is set forth in the following Table I:

TABLE 1

| ADDITIVE | AMOUNT | TIME TO REACH 94% ABSORBANCE |
|---|---|---|
| None | — | 50 Hours |
| 2,21 methylene bis (6-t-buty-4-methyl phenol) | 0.1% | 130 Hours |
| Product of Ex. 1 | 0.1% | 410 Hours |

What is claimed is:
1. A compound of the formula:

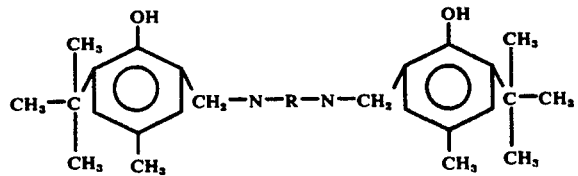

wherein R represents a $C_2$-$C_{10}$ alkylene or alkylidene radical.

2. A compound in accordance with claim 1 wherein R is an ethylene radical.

* * * * *